(12) United States Patent
Segura et al.

(10) Patent No.: US 10,009,107 B2
(45) Date of Patent: Jun. 26, 2018

(54) MULTI-POINT FREE SPACE OPTICAL COMMUNICATION SYSTEM

(71) Applicant: X Development LLC, Mountain View, CA (US)

(72) Inventors: Ben Warren Segura, Morgan Hill, CA (US); Walid Mathlouthi, Walnut Creek, CA (US)

(73) Assignee: X Development LLC, Mountain View, CA (US)

( * ) Notice: Subject to any disclaimer, the term of this patent is extended or adjusted under 35 U.S.C. 154(b) by 0 days. days.

(21) Appl. No.: 15/226,022

(22) Filed: Aug. 2, 2016

(65) Prior Publication Data
US 2018/0041279 A1 Feb. 8, 2018

(51) Int. Cl.
| | |
|---|---|
| *H04B 10/00* | (2013.01) |
| *H04J 14/02* | (2006.01) |
| *H04B 17/00* | (2015.01) |
| *H04B 10/40* | (2013.01) |
| *H04B 10/11* | (2013.01) |
| *H04B 10/25* | (2013.01) |

(Continued)

(52) U.S. Cl.
CPC ............ *H04B 10/40* (2013.01); *H04B 10/11* (2013.01); *H04B 10/118* (2013.01); *H04B 10/1125* (2013.01); *H04B 10/2504* (2013.01); *H04J 14/02* (2013.01); *H04B 10/00* (2013.01); *H04B 10/29* (2013.01)

(58) Field of Classification Search
CPC .... H04B 10/40; H04B 10/11; H04B 10/2504; H04B 10/08; H04B 10/112; H04B 10/00; H04B 10/1125; H04B 10/118; H04B 10/29; H04J 14/02

USPC ..................... 398/79, 37, 118, 125, 126, 128
See application file for complete search history.

(56) References Cited

U.S. PATENT DOCUMENTS

| | | | | |
|---|---|---|---|---|
| 5,786,923 A | * | 7/1998 | Doucet .............. | H04B 10/1121 398/122 |
| 6,268,944 B1 | * | 7/2001 | Szapiel ................ | H04B 10/118 398/129 |

(Continued)

OTHER PUBLICATIONS

International Search Report and Written Opinion for the PCT Application No. PCT/US2017/042741 dated Sep. 27, 2017.

*Primary Examiner* — Ken N Vanderpuye
*Assistant Examiner* — Abbas H Alagheband
(74) *Attorney, Agent, or Firm* — Lerner, David, Littenberg, Krumholz & Mentlik, LLP (57) ABSTRACT

A system includes an optical transceiver configured to transmit/receive at least one optical feed and a beam separator configured to separate the optical feed into a plurality of optical beams, and spatially combine the optical beams into the optical beam. The system also includes a dichroic mirror optically coupled to the beam separator and configured to reflect the optical beams, and allow beacon signals to pass therethrough. A position sensitive detector of the system optically couples to the dichroic mirror and is configured to sense an incidence position of each beacon signal allowed to pass through the dichroic mirror, and output a position error for each optical beam based on the sensed incidence positions. The system also includes a multi-axis optical steering system configured to direct each optical beam based on the corresponding position error outputted from the position sensitive detector and a corresponding transmit/receive target.

30 Claims, 6 Drawing Sheets

(51) Int. Cl.
  *H04B 10/112* (2013.01)
  *H04B 10/118* (2013.01)
  *H04B 10/29* (2013.01)

(56) References Cited

U.S. PATENT DOCUMENTS

| | | | | |
|---|---|---|---|---|
| 6,348,986 B1* | 2/2002 | Doucet | ................... | H04L 5/16 |
| | | | | 398/128 |
| 6,469,815 B1* | 10/2002 | Poon | .................... | H04B 10/118 |
| | | | | 398/131 |
| 6,522,440 B1* | 2/2003 | Poon | .................... | H04B 10/118 |
| | | | | 398/103 |
| 6,912,360 B1 | 6/2005 | Sparrold et al. | | |
| 7,136,585 B2 | 11/2006 | Bloom | | |
| 7,289,736 B1* | 10/2007 | Graves | ................... | G02B 26/06 |
| | | | | 398/119 |
| 7,587,141 B2* | 9/2009 | Fisher | ................ | H04B 10/1125 |
| | | | | 398/128 |
| 7,609,972 B2* | 10/2009 | Cunningham | ..... | H04B 10/1123 |
| | | | | 398/118 |
| 9,042,734 B2* | 5/2015 | Makowski | ............. | H04B 10/11 |
| | | | | 398/118 |
| 9,231,698 B2* | 1/2016 | Erkmen | ............. | H04B 10/1129 |
| 9,544,052 B2* | 1/2017 | Northcott | ........... | H04B 10/1125 |
| 2002/0131121 A1* | 9/2002 | Jeganathan | ........ | H04B 10/1127 |
| | | | | 398/128 |
| 2003/0067657 A1* | 4/2003 | Dimmler | .............. | H04B 10/112 |
| | | | | 398/129 |
| 2004/0081466 A1* | 4/2004 | Walther | ............. | H04B 10/1143 |
| | | | | 398/152 |
| 2004/0141754 A1* | 7/2004 | Cheng | ................ | H04B 10/1125 |
| | | | | 398/122 |
| 2004/0156638 A1* | 8/2004 | Graves | ............... | H04B 10/1125 |
| | | | | 398/129 |
| 2004/0258415 A1* | 12/2004 | Boone | ................ | H04B 10/1125 |
| | | | | 398/125 |
| 2005/0100339 A1* | 5/2005 | Tegge, Jr. | ............ | H04B 10/118 |
| | | | | 398/125 |
| 2006/0024061 A1* | 2/2006 | Wirth | ................. | H04B 10/1125 |
| | | | | 398/129 |
| 2015/0244458 A1* | 8/2015 | Erkmen | ............. | H04B 10/1129 |
| | | | | 398/122 |

\* cited by examiner

MULTI-POINT FREE SPACE OPTICAL COMMUNICATION SYSTEM

TECHNICAL FIELD

This disclosure relates to multi-point free space optical communication systems.

BACKGROUND

Optical networks use optical fibers for delivering high-speed content to customer premises. Generally, optical fibers are capable of providing Gigabit data transfer rates for both uplink and downlink connections between a content source and the customer premises. However, build costs associated with deploying paths of optical fibers from an access point or node of the optical network to each customer premises is costly and may also face unforeseen delays due to zoning ordinances.

Free-space optics may address the foregoing challenges associated with deploying conventional fiber by offering wide bandwidth and high data rates to provide the increasing demand for broadband traffic driven by internet access (e.g., unicast) and high-definition TV (e.g., multicast). Unlike radio frequencies, free-space optics technology also advantageously uses wavelengths in a license-free spectrum and generally exhibits high information security due to the line of sight between a transmitting terminal and a receiving terminal being difficult to intercept. However, due to the high directivity of light beams, free-space optics has generally been reserved for single point to point communication links. Therefore, the coverage and addressable market for free-space optics is generally limited to static communications between single buildings. While multi-beam free-space optics endpoints have been proposed using a lens assembly and a planar array of communication devices, these systems cannot be dynamically steered, and therefore, make provisioning static and non-flexible.

SUMMARY

One aspect of the disclosure provides a multi-point free space optical communication system. The system includes an optical transceiver, a first collimator, a beam separator, a dichroic mirror, a position sensitive detector, and a multi-axis optical steering system. The optical transceiver is configured to transmit/receive at least one optical feed, while the first collimator is optically coupled to the optical transceiver and configured to collimate the optical feed. The beam separator is optically coupled to the first collimator. The beam separator is configured to spatially separate the optical feed into a plurality of optical beams and spatially combine the plurality of optical beams into the optical feed. For instance, the beam separator spatially separates the optical feed into the plurality of optical beams when the transceiver transmits the optical feed, and spatially combines the plurality of optical beams into the optical feed when the transceiver receives the optical feed. The dichroic mirror is optically coupled to the beam separator and is configured to reflect the optical beams and allow beacon signals to pass therethrough. Each beacon signal corresponds to one of the optical beams. The position sensitive detector is optically coupled to the dichroic mirror. The position sensitive detector is configured to sense an incidence position of each beacon signal allowed to pass through the dichroic mirror and output a position error for each optical beam based on the sensed incidence positions of the beacon signals. The multi-axis optical steering system is optically coupled to the dichroic mirror and in communication with the position sensitive detector. The multi-axis optical steering system is configured to direct each optical beam based on the corresponding position error outputted from the position sensitive detector and a corresponding transmit/receive target. Each transmit/receive target is different from the other.

Implementations of the disclosure may include one or more of the following optional features. In some implementations, the optical transceiver is configured to transmit/receive a plurality of optical feeds. Each optical feed may have a different wavelength. In some examples, a multiplexer is optically coupled to the optical transceiver. The multiplexer may be configured to multiplex the plurality of optical feeds into a multi-wavelength optical feed and demultiplex the multi-wavelength optical feed into the plurality of optical feeds.

In some examples, the beam separator is configured to separate the multi-wavelength optical feed into the plurality of optical beams and spatially combine the plurality of optical beams into the multi-wavelength optical feed. Each optical beam may correspond to one of the optical feeds and may have the corresponding wavelength of the corresponding optical feed. For instance, each optical feed may be designated a specific color representative of the corresponding wavelength. The optical transceiver may include signal-mode optical fibers for transmitting the optical feeds to the multiplexer and multi-mode optical fibers for receiving the optical feeds from the multiplexer. In other examples, the optical transceiver is configured to transmit/receive a single optical feed. The optical beams spatially separated/combined by the beam separator may each share a single wavelength associated with the single optical feed. In these examples, the system assigns corresponding network interface terminals at the transmit/receive targets a corresponding time slot for transmitting/receiving the optical beams that each share the single wavelength. The optical transceiver may also include a single-mode optical fiber for transmitting the optical feed to the first collimator and a multi-mode optical fiber for receiving the optical-feed from the first collimator. The optical transceiver may include one or more optical fibers.

In some implementations, the system includes an optical circulator optically coupled to each optical fiber. The optical circulator may be configured to separate a transmission path and a receiving path. The system may also include a lens optically coupled to the multi-axis optical steering system and defining a center transmission axis. The multi-axis optical steering system may have a beam steering angle range. The lens may define a field of view configured to accommodate the beam steering angle range measured relative to the center transmission axis. The multi-axis optical steering system may include a micro-electro-mechanical system, an array of fast steering mirrors, or an optical phase array.

In some examples, the beam separator includes a prism for wavelength-division multiplexing optical feeds. For instance, the prism may spatially separate a multi-wavelength optical feed into the plurality of optical beams; each designated a different color corresponding to the different wavelength. The beam separator may include a diffraction grating for passive optical network optical feeds. The beacon signals allowed to pass through the dichroic mirror may be associated with a different spectral band than a spectral band associated with the optical beams reflected by the dichroic mirror. Thus, the dichroic mirror is operative as an optical filter that permits the spectral band associated with the beacon signals to pass therethrough and reflects the spectral band associated with the optical beams. The system may also include a second collimator optically coupled to the dichroic mirror and the position sensitive detector. The second collimator may be configured to collimate the beacon signals upon passing through the dichroic mirror.

Another aspect of the disclosure provides a method for operating a multi-point free space optical communication system. The method includes transmitting/receiving at least one optical feed at an optical transceiver and collimating the optical feed using a collimator optically coupled to the optical transceiver. When the optical transceiver transmits the optical feed, the method includes spatially separating, using a beam separator optically coupled to the first collimator, the optical feed into a plurality of optical beams. When the optical transceiver receives the optical feed, the method includes spatially combining, using the beam separator, the plurality of optical beams into the optical feed. The method also includes reflecting the optical beams using a dichroic mirror optically coupled to the beam separator and allowing, using the dichroic mirror, beacon signals to pass through the dichroic mirror. Each beacon signal corresponds to one of the optical beams. The method also includes sensing, using a position sensitive detector optically coupled to the dichroic mirror, an incidence position of each beacon signal allowed to pass through the dichroic mirror and outputting, using the position sensitive detector, a position error for each optical beam based on the sensed incidence positions of the beacon signals. The method further includes directing, using a multi-axis optical steering system optically coupled to the dichroic mirror and in communication with the position sensitive detector, each optical beam based on the corresponding position error outputted from the position sensitive detector and a corresponding transmit/receive target. Each transmit/receive target is different from the other.

This aspect may include one or more of the following optional features. In some implementations, transmitting/receiving the at least one optical feed at the optical transceiver includes transmitting/receiving a plurality of optical feeds at the optical transceiver. Each optical feed may have a different wavelength. For instance, each of the different wavelengths may be designated a corresponding color different from the colors designated for the other wavelengths. The method may also include multiplexing, using a multiplexer optically coupled to the optical transceiver, the plurality of optical feeds into a multi-wavelength optical feed. The method may also include demultiplexing, using the multiplexer, the multi-wavelength optical feed into the plurality of optical feeds. The spatially separating the optical feed into the plurality of optical beams may include spatially separating the multi-wavelength optical feed into the plurality of optical beams. Each optical beam may correspond to one of the optical feeds and may have the corresponding wavelength of the corresponding optical feed. The spatially combining the plurality of optical beams into the optical feed may include spatially combining the plurality of optical beams into the multi-wavelength optical feed. In some examples, the optical transceiver includes single-mode optical fibers for transmitting the optical feeds to the multiplexer and multi-mode optical fibers for receiving the optical feeds from the multiplexer.

In other configurations, the transmitting/receiving the at least one optical feed at the optical transceiver includes transmitting/receiving a single optical feed. In these examples, the optical beams spatially separated/combined by the beam separator may each share a single wavelength associated with the single optical feed. The optical transceiver may also include a single-mode optical fiber for transmitting the optical feed to the first collimator and a multi-mode optical fiber for receiving the optical feed from the first collimator. The optical transceiver may also include one or more optical fibers.

The method may also include separating, using an optical circulator optically coupled to each optical fiber, a transmission path and a receiving path. In some examples, the method includes accommodating, using a field of view defined by a lens optically coupled to the multi-axis optical steering system and defining a center transmission axis, a beam steering angle range of the multi-axis optical steering system measured relative to the center transmission axis. The multi-axis optical steering system may include a micro-electro-mechanical system, an array of fast steering mirrors, or an optical phase array. The beam separator may include a prism for wavelength-division multiplexing optical feeds. For instance, the prism may designate each optical beam a different color corresponding to the wavelength. The beam separator may also include a diffraction grating for passive optical network optical feds. The beacon signals allowed to pass through the dichroic mirror may be associated with a different spectral band than a spectral band associated with the optical beams reflected by the dichroic mirror. The method may further include collimating, using a second collimator optically coupled to the dichroic mirror and the position sensitive detector, the beacon signals upon passing through the dichroic mirror.

The details of one or more implementations of the disclosure are set forth in the accompanying drawings and the description below. Other aspects, features, and advantages will be apparent from the description and drawings, and from the claims.

DETAILED DESCRIPTION

Communicating optical signals over free space optical links offers wide bandwidth and high data rates for meeting increases in demand for broadband traffic driven by unicast internet access and multi-cast high-definition television. Accordingly, free space optics technology may serve as a low cost alternative over deploying conventional optical fibers to reach customer premises. Implementations herein are directed toward distributing multi-Gigabit connectivity from an established fiber point of presence (POP) site to multiple customer premises using multi-point-free space optical (MP-FSO) terminals. To provide dynamic beam steering at a low cost, the exemplary MP-FSO terminals include a position sensitive detector configured to output position errors for optical beams by sensing an incidence position of beacon signals provided as feedback from transmit/receive targets, and thereafter utilize a multi-axis optical steering system configured to direct each optical beam based on the corresponding position error outputted from the position sensitive detector and the corresponding transmit/receive target.

Figure 1A:
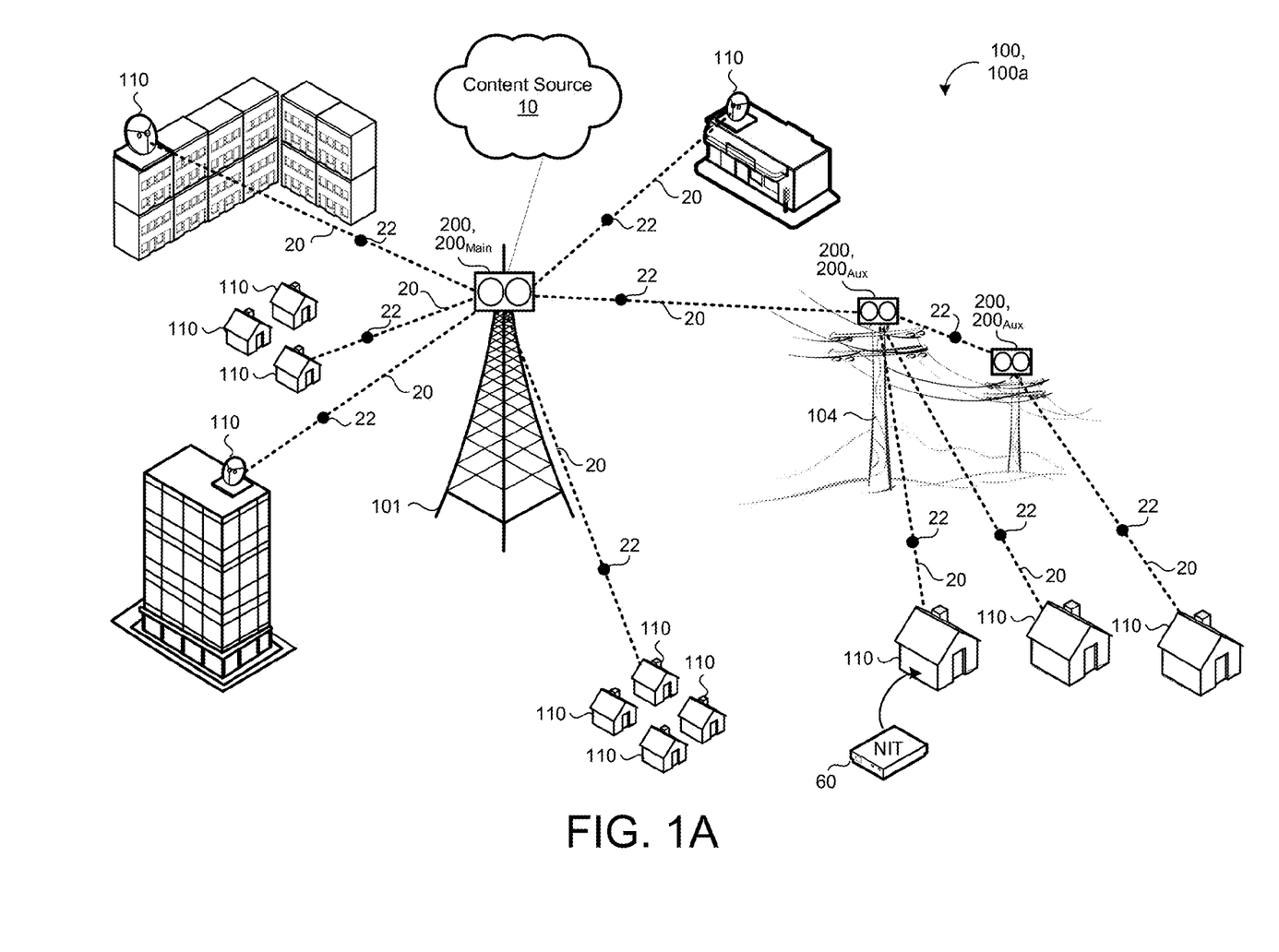
FIG. 1A is a schematic view of an example point-to-multipoint free space optical communication system using wavelength division multiplexed optical feeds.
Figure 1B:
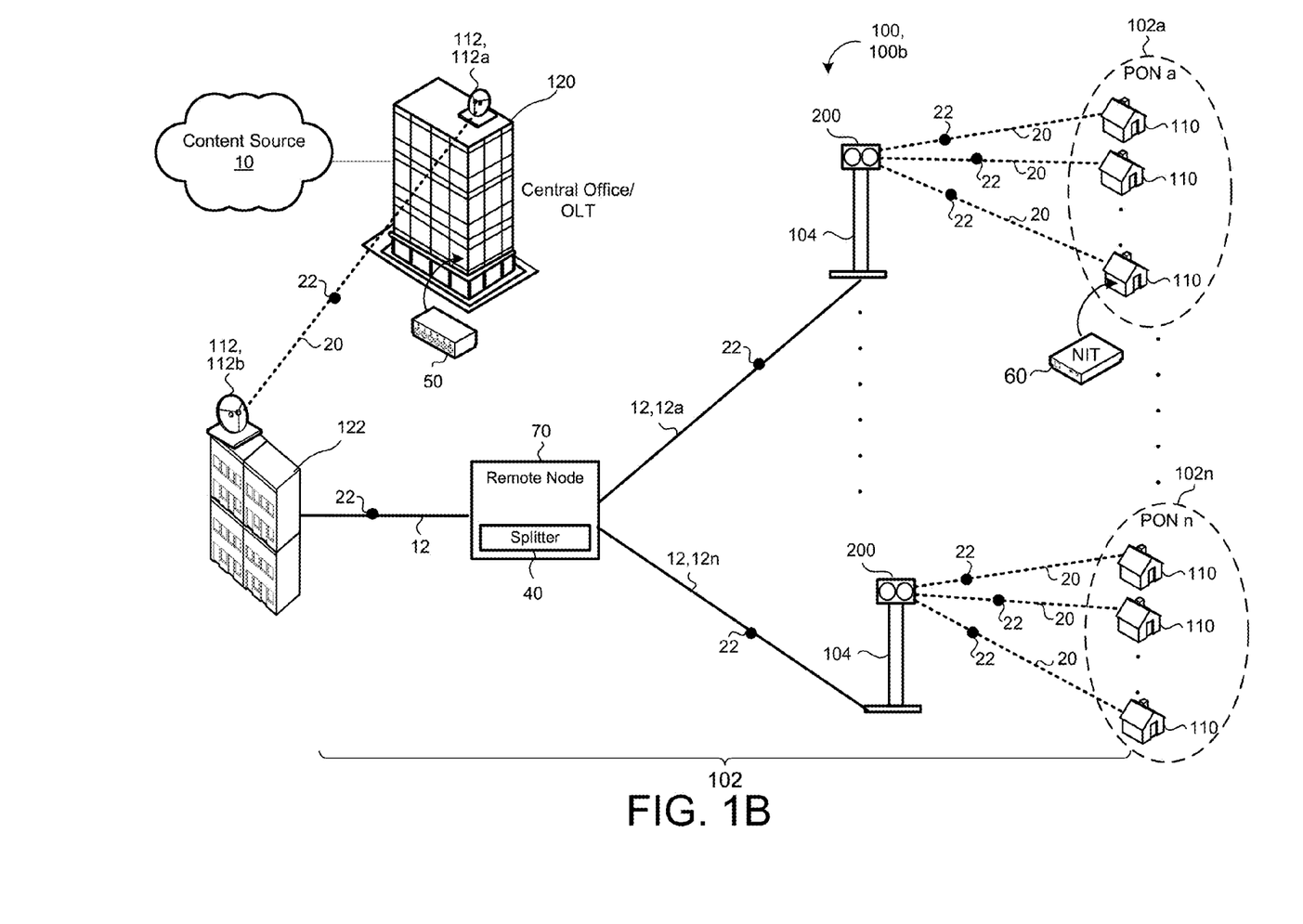
FIG. 1B is a schematic view of an example point-to-multipoint free space optical communication system provisioning one or more passive optical networks.

Referring to FIGS. 1A and 1B, in some implementations, a point-to-multipoint free space optical communication (FSOC) system 100, 100a-b includes MP-FSO terminals 200 communicating with transmit/receive targets 110 (e.g., destination terminals). The transmit/receive targets 110 may be user terminals (e.g., mobile devices, residential WiFi devices, home networks, etc.) including network interface terminals (NITs) 60 that receive optical signals 22 from the MP-FSO terminals 200 via free space optical (FSO) beams 20 (e.g., optical links). As used herein, the optical signals 20 refer to communications of data containing content. In some examples, the NITs 60 include optical network units/terminals (ONTs) 60. Each NIT 60 may include an optical transmitter/receiver (i.e., transceiver) for transmitting and receiving FSO beams 20 to and from the MP-FSO terminals 200. The NITs 60 may also transmit beacon signals 224 (FIGS. 2 and 5) to corresponding MP-FSO terminals 200 for determining position errors 230 (FIGS. 2 and 5) associated with FSO beams 20 transmitted from the MP-FSO terminal 200 to the corresponding transmit/receive target 110. In some implementations, each NIT 60 converts a received optical signal 22 from one of the MP-FSO terminals 200 (over the FSO link 20) into an electrical signal to provide Layer 2 media access control functions for a residential network associated with the corresponding transmit/receive target 110 (e.g., a residential household).

FIG. 1A provides a wavelength division multiplexed (WDM) FSOC system 100a having a main MP-FSO terminal $200_{Main}$ and one or more auxiliary MP-FSO terminals $200_{Aux}$. The main MP-FSO terminal $200_{Main}$ includes a backhaul connection with a content source 10 and transmits/receives multiple spatial FSO beams 20 to corresponding transmit/receive targets 110 for providing optical signals 20 (each containing content/data from the content source 10) to multiple end users within different coverage areas. In some examples, the content source 10 is an internet service provider (ISP). The content source 10 may provide content/data such as, but not limited to, video media distribution, internet data, and/or voice data.

In some examples, the main MP-FSO terminal $200_{Main}$ mounts to a communication tower 101 or other structure and maintains a line of sight with all the transmit/receive targets 110 for transmitting/receiving the multiple spatial FSO beams 20 therewith. In some examples, the main MP-FSO terminal $200_{Main}$ uses a different wavelength for each FSO beam 20 the terminal $200_{Main}$ transmits to the corresponding transmit/receive target 110. Additionally, the main MP-FSO terminal $200_{Main}$ distributes the multiple wavelength FSO beams 20 to the auxiliary MP-FSO terminals $200_{Aux}$ for servicing other transmit/receive targets 110 outside the coverage area of the main MP-FSO terminal $200_{Main}$, or other transmit/receiving targets 110 having an obstructed line of sight with the main MP-FSO terminal $200_{Main}$. In some implementations, the auxiliary MP-FSO terminals $200_{Aux}$ mount to utility poles 104 that route power/communication lines. Accordingly, the auxiliary MP-FSO terminals $200_{Aux}$ may cascade from the main MP-FSO terminal $200_{Main}$ for provisioning FSO beams 20 with dedicated wavelengths to separate transmit/receive targets 110.

Figure 2:
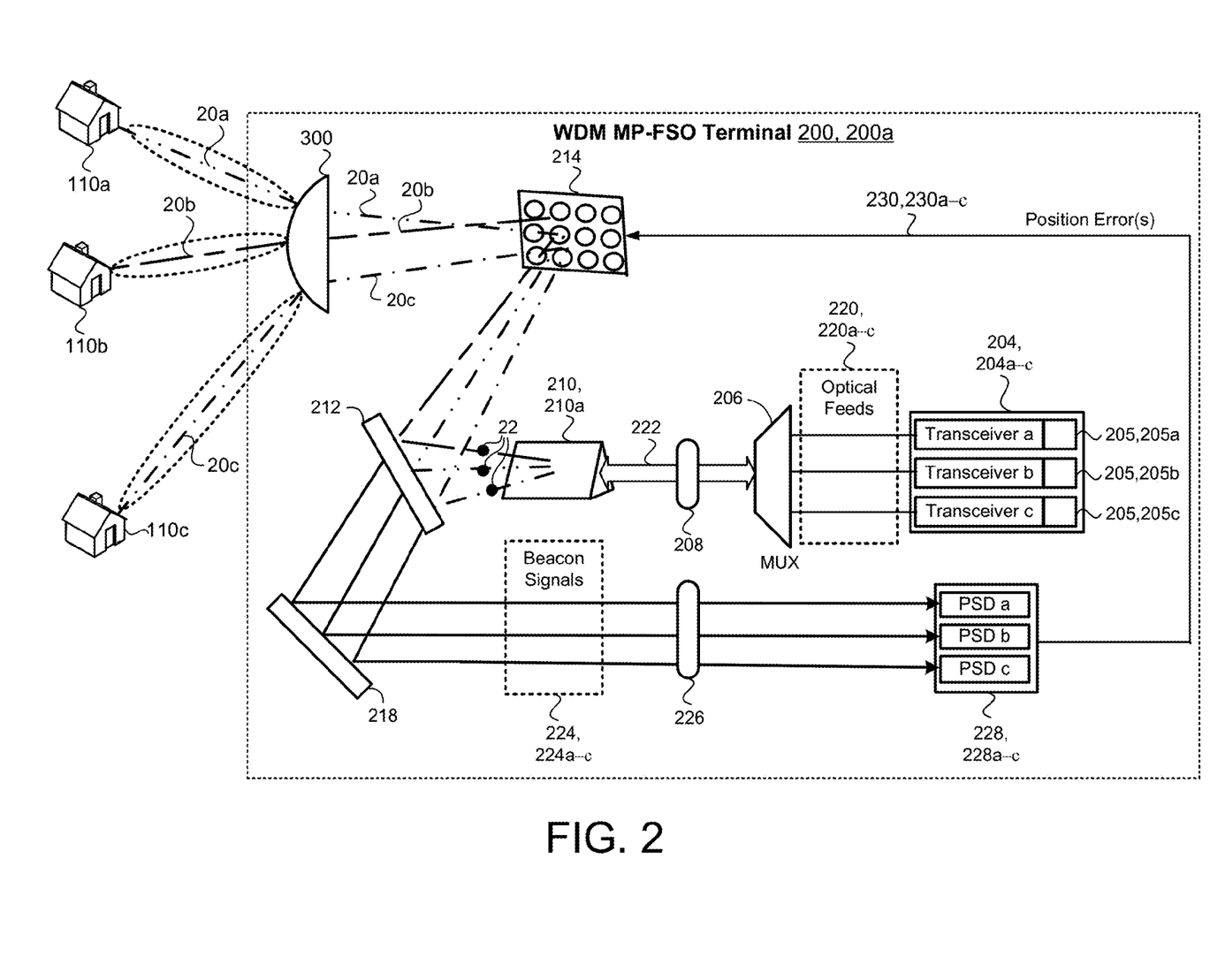
FIG. 2 is a schematic view of an example multi-point free space optical terminal including a wavelength division multiplexer.

The MP-FSO terminals $200_{Main}$, $200_{Aux}$ may include wavelength division multiplexed (WDM) MP-FSO terminals 200a (FIG. 2) having a multiplexer 206 (FIG. 2) for multiplexing a plurality of different wavelength optical feeds 220 (FIG. 2) into a multi-wavelength optical feed 222 (FIG. 2). Thereafter, a beam separator 210, 210a (e.g., a prism) (FIG. 2) spatially separates the multi-wavelength optical feed 222 into the plurality of optical beams 20 for transmission to the corresponding targets 110 and/or other terminals 200 when cascading. Each optical beam 20 may be associated with a dedicated color representing the different wavelength.

FIG. 1B provides a FSOC system 100b for communicating multiple spatial FSO beams 20 each sharing the same wavelength for compatibility with one or more existing optical networks 102, 102a-n (e.g., passive optical network (PON) or a Gigabit-capable PON (GPON)). A passive optical network (PON) 102 is a point-to-multipoint network architecture that uses optical splitters 40 to enable a single optical fiber feeder 12 to serve multiple transmit/receive targets 110 (e.g. up to 16 households per PON 102a-n). Although the optical network 100 is described with respect to a passive optical network, an active optical network (AON) may be used as well.

In some examples, a central office (CO) 120 receives content/data from the content source 10 that may be transferred as optical signals 22 to the transmit/receive targets 110 each associated with corresponding end users. The CO 120 includes an optical line terminal (OLT) 50 (e.g., optical transmitter/receiver or transceiver) serving as an endpoint of the optical network 102 by converting electrical signals used by equipment of the content source 10 to/from optical signals 22 used by the optical network 102. In some implementations, the OLT 50 sends the optical signal 22 via a FSO beam 20 from a point-to-point (PTP) FSO terminal 112, 112a at the CO 120 to another PTP FSO terminal 112, 112b mounted upon another building/dwelling 122. Thereafter, the optical signal 22 may be fed through a single optical fiber feeder 12 to a remote node 70, which uses the optical splitter 40 to split the optical signal 22 for distribution to one or more MP-FSO terminals 200 via multiple optical fibers 12, 12a-n. In some implementations, power lines, such as 110 VAC electric lines or from commonly available Cable Television 9CATV power supply lines, route the optical fibers 12 and provide power.

The optical fibers 12 may feed the optical signals 22 to the MP-FSO terminals 200 and each MP-FSO terminal 200 may provision a full PON 102, 102a-n by transmitting/receiving the multiple spatial optical beams 20 (sharing the single wavelength) to/from the multiple transmit/receive targets 110 within the corresponding PON 102a-n. Accordingly, each MP-FSO terminal 200 may steer the different optical signals 22 having the single shared wavelength via the optical beams 20 to the corresponding NITs/ONTs 60 at the transmit/receive targets 110. In some scenarios, the coverage range of each MP-FSO terminal 200 is limited to a few hundred meters (e.g., a threshold range (FIG. 4) less than 200 meters). However, the MP-FSO terminals 200 may implement an optical amplifier, such as a semiconductor optical simplifier (SOA), to extend the coverage range for the corresponding PON 102, 102a-n provisioned by each MP-FSO terminal 200. The MP-FSO terminals 200 may mount to utility poles 104.

In some implementations, the MP-FSO terminals 200 assign the corresponding NITs/ONTs 60 at the transmit/receive targets 110 a corresponding time slot for communicating (i.e., transmitting/receiving) optical signals 22 with the corresponding MP-FSO terminal 220 via the shared wavelength optical signal 20. Accordingly, the MP-FSO terminals $200_{Main}$, $200_{Aux}$ may include non-WDM MP-FSO terminals 200b (FIG. 5) having a beam separator 210, 210b (e.g., diffraction grating) (FIG. 5) that spatially separates a single wavelength optical feed 220 into the plurality of optical beams 20 for transmission to the corresponding targets 110 and/or other terminals 200 when cascading.

Referring to FIG. 2, the WDM MP-FSO terminal 200a includes a plurality of transceivers 204, 204a-c, the multiplexer (MUX) 206, the beam separator 210, a dichroic mirror 212, a multi-axis optical steering system 214, an output lens 300, and a position sensitive detector 228. Each transceiver 204a-c is configured to transmit/receive a corresponding optical feed 220, 220a-c having a different wavelength from the other optical feeds 220. While the example shows the WDM MP-FSO terminal 200a including three transceivers 204a-c, other examples include the WDM MP-FSO terminal 200a including more or less transceivers 204 each configured to transmit/receive a corresponding optical feed 220 having a dedicated wavelength different from the other optical feeds 220. Each transceiver 204 is optically coupled to the multiplexer 206 and may include single-mode optical fibers for transmitting the optical feeds 220 to the multiplexer 206 and multi-mode optical fibers for receiving the optical feeds 220. In some configurations, each transceiver 204, 204a-c includes a corresponding optical circulator 205, 205a-c optically coupled to each optical fiber and configured to separate the transmission and receiving paths among the single-mode optical fibers when transmitting the optical feeds 220 to the multiplexer 206 or the multi-mode optical fibers when receiving the optical feeds 220 from the multiplexer 206.

When the transceivers 204 operate as transmitters for transmitting optical signals 22 to the transmit/receive targets 110, the multiplexer 206 multiplexes the plurality of optical feeds 220 into the multi-wavelength optical feed 222, a first collimator 208 collimates the optical feed 222, and the beam separator 210 spatially separates the collimated multi-wavelength optical feed 222 into corresponding optical beams 20, 20a-c each associated with a corresponding one of the optical feeds 220a-c and having the corresponding wavelength of the corresponding optical feed 220a-c. In some examples, the beam separator 210 includes a prism 210a for spatially separating the optical feed 222 into the optical beams 20a-c each associated with a dedicated color representing the different wavelength. The beam separator 210 may optionally include a diffraction grating 210b (FIG. 5) in lieu of the prism 210a for spatially combining the received optical beams 20 or spatially separating the multi-wavelength optical feeds 222.

Conversely, when the transceivers 204 operate as receivers for receiving optical signals 22 from the transmit/receive targets 110, the beam separator 210 spatially combines the plurality of optical beams 20a-c from corresponding ones of the transmit/receive targets 110, 110a-c into the multi-wavelength optical feed 222, the first collimator 208 collimates the optical feed 222, and the multiplexer 206 de-multiplexes the multi-wavelength optical feed 222 into the plurality of optical feeds 220a-c each received by corresponding ones of the transceivers 204a-c.

The dichroic mirror 212 is optically coupled to both the beam separator 210a and the multi-axis optical steering system 214. The dichroic mirror 212 is configured to reflect the optical beams 20a-c separated by the beam separator 210a toward the multi-axis optical steering system 214, and allow beacon signals 224, 224a-c to pass therethrough and reflect off of a beacon mirror 218 toward the position sensitive detector 228. For instance, the optical beams 20 may be associated with a spectral band that reflects off of the dichroic mirror 212 while the beacon signals 224 may be associated with a different spectral band than the optical beams 20 that propagates through the dichroic mirror 212.

Each beacon signal 224a-c passing through the dichroic mirror 212 is transmitted from a corresponding one of the transmit/receive targets 110a-c and is associated with a corresponding one of the optical beams 20a-c. In some implementations, the position sensitive detector 228 is optically coupled to the dichroic mirror 212 via the beacon mirror 218 and includes a plurality of position sensitive detectors 228a-c each configured to receive a corresponding one of the beacon signals 224a-c. A second collimator 226 optically coupled to the beacon mirror 218 and the position sensitive detector 228 may collimate the beacon signals 224 upon passing through the dichroic mirror 212 and reflecting off of the beacon mirror 218. Thereafter, each position sensitive detector 228a-c is configured to sense an incidence position for each corresponding received beacon signal 224a-c and output a corresponding position error 230, 230a-c for each optical beam 20a-c based on the sensed incidence positions of the corresponding beacon signal 224a-c. As used herein, the incidence position for each beacon signal 224a-c provides feedback from the corresponding transmit/receive target 110a-c that indicates at least one of position, tilt, or offset of the corresponding optical beam 20a-c last received by the transmit/receive target 110a-c from the WDM MP-FSO terminal 200a.

In some examples, the position sensitive detector(s) 228 includes a near field of view (NFOV) position sensitive detector. In some configurations, the WDM MP-FSO terminal 200a includes a quad cell or charge coupled device (CCD) camera in lieu of the position sensitive detector to sense the incidence position for each beacon signal 224 that provides the necessary feedback indicating the at least one of position, tilt, or offset of the corresponding optical beam 20a-c.

In some implementations, the multi-axis optical steering system 214 is in communication with the position sensitive detectors 228a-c and the position errors 230a-c outputted by the position sensitive detectors 228a-c drive the multi-axis optical steering system 214 to adjust a direction of each optical beam 20a-c for transmission to the corresponding transmit/receive target 110a-c. Accordingly, the multi-axis optical steering system 214 may be associated with a beam angle steering range and may use the position error 230 and the position of the transmit/receive target 110 to steer the corresponding optical beam 20 toward the transmit/receive target 110. While the example multi-axis optical steering system 214 of the WDM MP-FSO terminal 200a includes a micro-electro-mechanical system (MEMS), the multi-axis optical steering system 214 may include an array of fast steering mirrors or an optical phase array (OPA) in other examples. In examples when the steering system 214 includes the OPA, the OPA is configured to steer the optical beams 20 by shifting the phase of each corresponding beam 20 as the beam 20 passes through the OPA. Thus, the OPA may steer each beam 20 completely independently by sending out the optical beams 20 toward multiple spatial directions.

Figure 3:
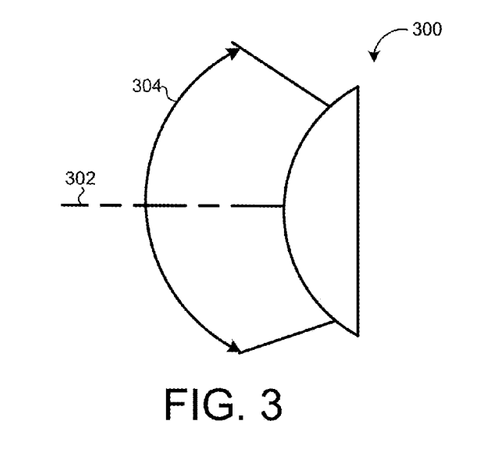
FIG. 3 is a schematic view of an example output lens for a multi-point free space optical terminal defining a center transmission axis and including a field of view configured to accommodate a beam steering angle range measured relative to the center transmission axis.

The multi-axis optical steering system 214 directs the transmitted optical beams 20 to the output lens 300 optically coupled thereto. Referring to FIG. 3, in some implementations, the output lens 300 includes a fisheye optical lens 300 configured to accommodate wide angles for flexibility with beam steering. The lens 300 defines a center transmission axis 302 and a field of view 304 configured to accommodate the beam steering angle range of the multi-axis optical steering system 214 measured relative to the center transmission axis 302. Referring back to FIG. 2, upon passing through the output lens 300, each beam 20a-c transmits through free space to the corresponding transmit/receive target 110a-c. Thereafter, the transmit/receive targets 110a-c may transmit corresponding beacon signals 224a-c back to the WDM MP-FSO terminal 200a for use by the position sensitive detector 228 to output the position error 230 for each optical beam 20a-c such that the multi-axis optical steering system 214 may adjust the direction of the optical beams 20a-c during subsequent transmissions.

Figure 4:
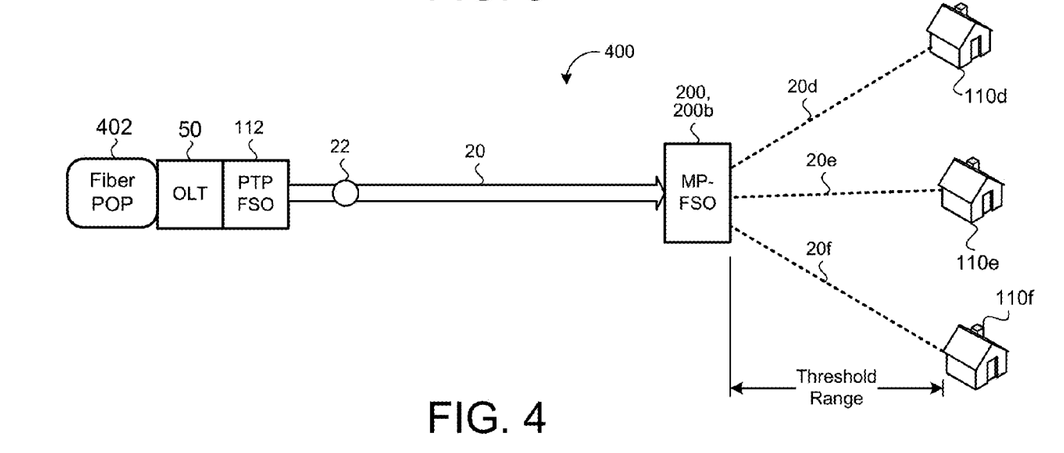
FIG. 4 is a schematic view of an example passive optical network topology using a multi-point free space optical terminal.

FIG. 4 is a schematic view 400 of an example passive optical network (PON) topology using a MP-FSO terminal 200, 200b. In some examples, the PON includes a Gigabit-capable PON (GPON) having a fiber point of presence (POP) 402 operative as an access point for an optical fiber path. The fiber POP 402 may include an OLT 50 for sending an optical signal 22 via an FSO beam 20 from a PTP FSO terminal 112 at the fiber POP 402 to the MP-FSO terminal 200b. Here, the MP-FSO terminal 200b is associated with a non-WDM MP-FSO terminal 200b configured to spatially separate the FSO beam 20 from the PTP FSO terminal 112 into a plurality of optical beams 20, 20d-f each sharing a single wavelength for transmission to corresponding ones of a plurality of transmit/receive targets 110, 110d-f of the PON. Here, the MP-FSO terminal 200b may steer each optical beam 20d-f to the corresponding transmit/receive target 110d-f. In some examples, the range of the MP-FSO terminal 200b is limited to a threshold range, i.e., typically a few hundred meters. For instance, the threshold range may be less than 200 m. In some implementations, the MP-FSO terminal 200b includes an optical amplifier (e.g., a semiconductor optical amplifier (SOA) for extending the threshold range.

Figure 5:
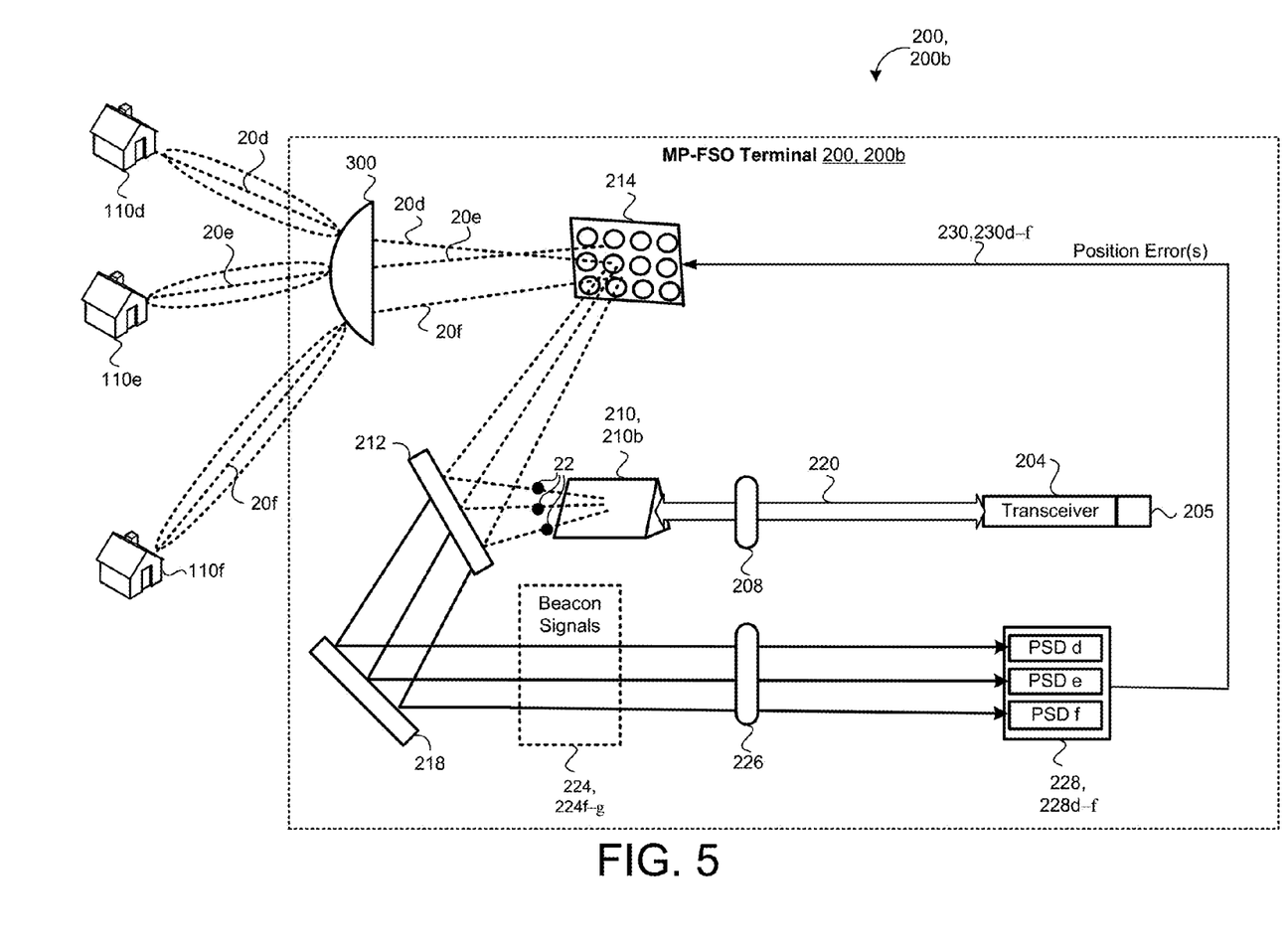
FIG. 5 is a schematic view of an example multi-point free space optical terminal for a passive optical network.

Referring to FIGS. 4 and 5, the MP-FSO terminal 200, 200b includes a transceiver 204, the beam separator 210, the dichroic mirror 212, the multi-axis optical steering system 214, the output lens 300, and the position sensitive detector 228. The MP-FSO terminal 200b is substantially similar to the WDM MP-FSO terminal 200a of FIG. 2 except the MP-FSO terminal 200b only receives a single wavelength optical feed 220 from the OLT 50 and spatially separates the single wavelength optical feed 220 into a plurality of optical beams 20, 20d-f for transmission to corresponding transmit/receive targets 110, 100d-f.

The transceiver 204 is optically coupled to the first collimator 206 and configured to transmit/receive the single wavelength optical feed 220 to and from the first collimator 208. The transceiver 204 may include a single-mode optical fiber for transmitting the optical feed 220 to the first collimator 208 and a multi-mode optical fiber for receiving the optical feed 220 from the first collimator 208. In some configurations, the transceiver 204 includes a corresponding optical circulator 205 optically coupled to each optical fiber and configured to separate the transmission and receiving paths among the single-mode optical fiber when transmitting the optical feed 220 to the first collimator 208 or the multi-mode optical fiber when receiving the optical feed 220 from the first collimator 208.

When the transceiver 204 is operative as a transmitter for transmitting optical signals 22 to the transmit/receive targets 110, the first collimator 208 collimates the optical feed 220 and the beam separator 210 spatially separates the collimated single wavelength optical feed 220 into corresponding optical beams 20, 20d-f each sharing the single wavelength of the optical feed 220. In some implementations, the beam separator 210 includes the diffraction grating 210b configured to spatially separate the single wavelength optical feed 220 into the plurality of optical beams 20, 20d-f.

Conversely, when the transceiver 204 is operative as a receiver for receiving optical signals 22 from the transmit/receive targets 110, the beam separator (e.g., diffraction grating) 210b spatially combines the plurality of optical beams 20d-f sharing the single wavelength into the single wavelength optical feed 220 and the first collimator 208 collimates the optical feed 220 received by the transceiver 204.

As with the WDM MP-FSO terminal 200a of FIG. 2, the dichroic mirror 212 is optically coupled to both the beam separator 210b and the multi-axis optical steering system 214 and is configured to reflect the optical beams 20d-f separated by the beam separator 210b toward the multi-axis optical steering system 214, and allow beacon signals 224, 224d-f to pass therethrough and reflect off of the beacon mirror 218 toward the position sensitive detector 228. Each beacon signal 224d-f passing through the dichroic mirror 212 is transmitted from a corresponding one of the transmit/receive targets 110d-f and is associated with a corresponding one of the optical beams 20d-f. In some implementations, the position sensitive detector 228 is optically coupled to the dichroic mirror 212 via the beacon mirror 218 and includes a plurality of position sensitive detectors 228d-f each configured to receive a corresponding one of the beacon signals 224d-f. The second collimator 226 is optically coupled to both the beacon mirror 218 and the position sensitive detectors 228 and may collimate the beacon signals 224 upon passing through the dichroic mirror 212 and reflecting off of the beacon mirror 218. As with the position sensitive detectors 224a-c of FIG. 2, the position sensitive detectors 224d-f may include a NFOV position sensitive detector, a quad cell, or a CCD camera. Each position sensitive detector 224d-f may sense an incidence position for each corresponding received beacon signal 224d-f and output a corresponding position error 230, 230d-f for each optical beam 20d-f based on the sensed incidence positions.

In some implementations, the multi-axis optical steering system 214 (e.g., the MEMS, the array of fast steering mirrors, or the OPA) is in communication with the position sensitive detectors 228d-f and the position errors 230d-f outputted by the position sensitive detectors 228d-f drive the multi-axis optical steering system 214 to adjust a direction of each optical beam 20d-f for transmission to the corresponding transmit/receive target 110d-f. Thereafter, the multi-axis optical steering system 214 directs the transmitted optical beams 20 to the output lens 300 optically coupled thereto and defining the center transmission axis 302 (FIG. 3) and the field of view 304 (FIG. 3) configured to accommodate the beam steering angle range measured relative to the center transmission axis 302.

Upon passing through the output lens 300, each beam 20d-f transmits through free space to the corresponding transmit/receive target 110d-f. Thereafter, the transmit/receive targets 110*d-f* may transmit corresponding beacon signals 224*d-f* back to the MP-FSO terminal 200*b* for use by the position sensitive detector 228 to output the position error for each optical beam 20*d-f* such that the multi-axis optical steering system 214 may adjust the direction of the optical beams 20*d-f* during subsequent transmissions.

Figure 6:
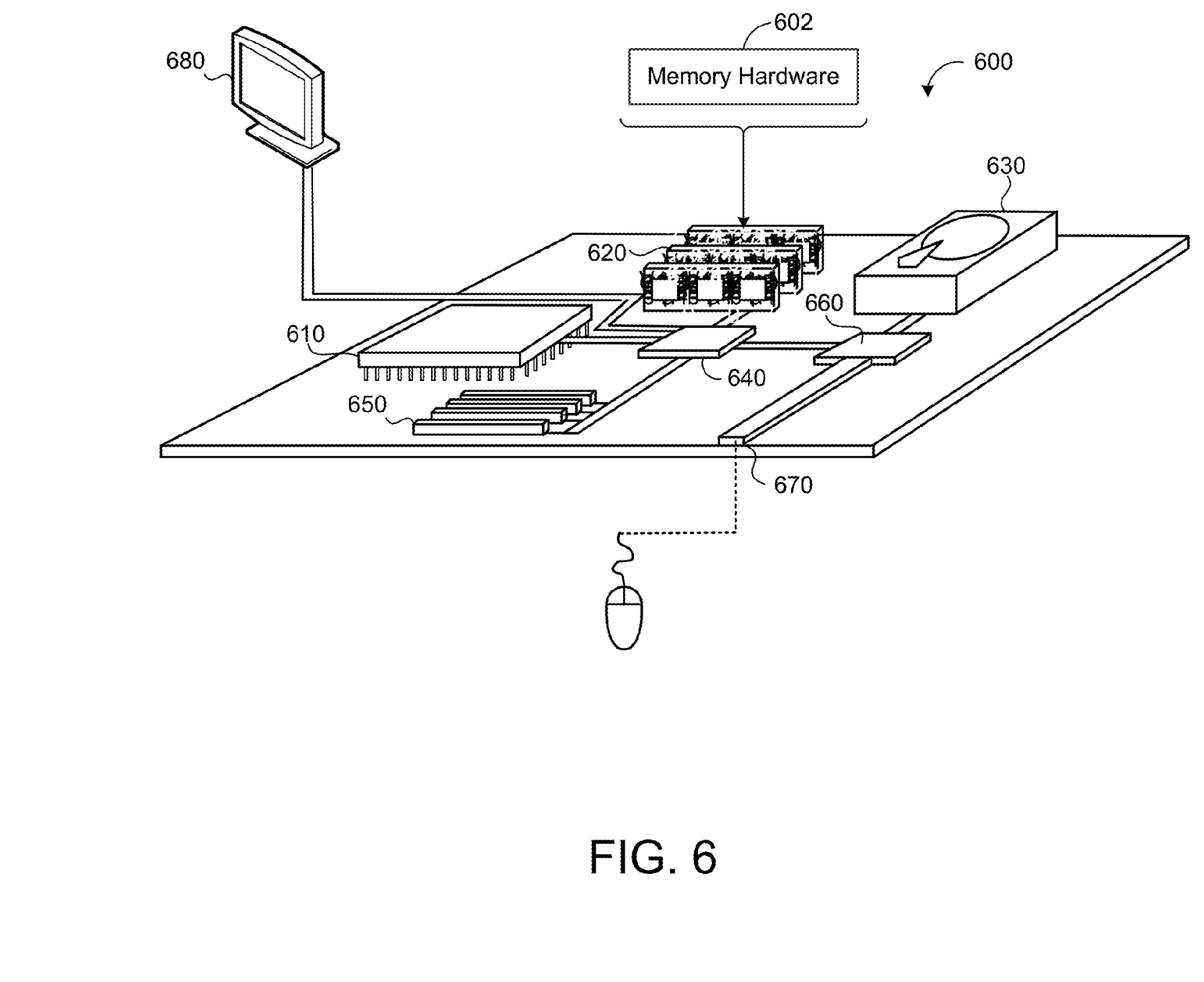
FIG. 6 is a schematic view of example control hardware of a multi-point free space optical terminal Like reference symbols in the various drawings indicate like elements.

FIG. 6 is a schematic view of an example of the control hardware 600 that may be used to implement the systems and methods described in this document. The control hardware 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The control hardware 600 includes a processor 650, memory 620, a storage device 630, a high-speed interface/controller 640 connecting to the memory 620 and high-speed expansion ports 650, and a low speed interface/controller 660 connecting to a low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a GUI on an external input/output device, such as a display 680 coupled to a high speed interface 640. In other implementations, multiple processors and/or multiple buses may be used, as appropriate, along with multiple memories and types of memory. Also, multiple control hardware devices 800 may be connected, with each device providing portions of the necessary operations (e.g., as a server bank, a group of blade servers, or a multi-processor system).

The memory 620 includes hardware that stores information non-transitorily within the control hardware 600. The memory 620 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the control hardware 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 630 is capable of providing mass storage for the control hardware 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The control hardware 600 may be implemented in a number of different forms, as shown in the figure. For example, it may be implemented as a standard server or multiple times in a group of such servers, as a laptop computer, or as part of a rack server system. In other implementations, the control hardware includes a field programmable gate array (FGPA), a digital signal processor (DSP), or any other suitable circuitry.

In some implementations, the control hardware 600 is in communication with memory hardware 602 (e.g., in the memory 620). The control hardware 600 may implement the multi-axis optical steering system 214 and the position sensitive detector 228 at each of the MP-FSO terminals 200*a*, 200*b* of FIGS. 2 and 5. Thus, the control hardware 600 at the MP-FSO terminals 200*a*, 200*b* may sense an incidence position of each received beacon signal 224 passing through the dichroic mirror 212, output the position error 230 for each optical beam 20 based on the sensed incidence positions of the beacon signals 224, and direct each optical beam 20 based on the corresponding position error and the corresponding transmit/receive target 110.

A software application (i.e., a software resource 110*s*) may refer to computer software that causes a computing device to perform a task. In some examples, a software application may be referred to as an "application," an "app," or a "program." Example applications include, but are not limited to, mobile applications, system diagnostic applications, system management applications, system maintenance applications, word processing applications, spreadsheet applications, messaging applications, media streaming applications, social networking applications, and gaming applications.

The memory hardware 110*hm* may be physical devices used to store programs (e.g., sequences of instructions) or data (e.g., program state information) on a temporary or permanent basis for use by a computing device 110*hc*. The non-transitory memory 110*hm* may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

A number of implementations have been described. Nevertheless, it will be understood that various modifications may be made without departing from the spirit and scope of the disclosure. Accordingly, other implementations are within the scope of the following claims.

What is claimed is:

1. A system comprising:
   an optical transceiver configured to transmit/receive at least one optical feed;
   a first collimator optically coupled to the optical transceiver and configured to collimate the optical feed;
   a beam separator optically coupled to the first collimator, the beam separator configured to:
      spatially separate the optical feed into a plurality of optical beams; and
      spatially combine the plurality of optical beams into the optical feed;
   a dichroic mirror optically coupled to the beam separator and configured to:
      reflect the optical beams; and
      allow beacon signals to pass therethrough, each beacon signal corresponding to one of the optical beams;
   a position sensitive detector optically coupled to the dichroic mirror, the position sensitive detector configured to:
      sense an incidence position of each beacon signal allowed to pass through the dichroic mirror; and
      output a position error for each optical beam based on the sensed incidence positions of the beacon signals; and
   a multi-axis optical steering system optically coupled to the dichroic mirror and in communication with the position sensitive detector, the multi-axis optical steering system configured to direct each optical beam based on the corresponding position error outputted from the position sensitive detector and a corresponding transmit/receive target, each transmit/receive target different from the other.

2. The system of claim 1, wherein the optical transceiver is configured to transmit/receive a plurality of optical feeds, each optical feed having a different wavelength.

3. The system of claim 2, further comprising a multiplexer optically coupled to the optical transceiver, the multiplexer configured to multiplex the plurality of optical feeds into a multi-wavelength optical feed and demultiplex the multi-wavelength optical feed into the plurality of optical feeds.

4. The system of claim 3, wherein the beam separator is configured to:
   separate the multi-wavelength optical feed into the plurality of optical beams, each optical beam corresponding to one of the optical feeds and having the corresponding wavelength of the corresponding optical feed; and
   spatially combine the plurality of optical beams into the multi-wavelength optical feed.

5. The system of claim 4, wherein the optical transceiver comprises:
   single-mode optical fibers for transmitting the optical feeds to the multiplexer; and
   multi-mode optical fibers for receiving the optical feeds from the multiplexer.

6. The system of claim 1, wherein the optical transceiver is configured to transmit/receive a single optical feed and the optical beams spatially separated/combined by the beam separator each share a single wavelength associated with the single optical feed.

7. The system of claim 6, wherein the optical transceiver comprises:
   a single-mode optical fiber for transmitting the optical feed to the first collimator; and
   a multi-mode optical fiber for receiving the optical feed from the first collimator.

8. The system of claim 1, wherein the optical transceiver comprises one or more optical fibers.

9. The system of claim 8, further comprising an optical circulator optically coupled to each optical fiber, the optical circulator configured to separate a transmission path and a receiving path.

10. The system of claim 1, further comprising a lens optically coupled to the multi-axis optical steering system and defining a center transmission axis, the multi-axis optical steering system having a beam steering angle range, and the lens defining a field of view configured to accommodate the beam steering angle range measured relative to the center transmission axis.

11. The system of claim 1, wherein the multi-axis optical steering system comprises a micro-electro-mechanical system, an array of fast steering mirrors, or an optical phase array.

12. The system of claim 1, wherein the beam separator comprises a prism for wavelength-division multiplexing optical feeds.

13. The system of claim 1, wherein the beam separator comprises a diffraction grating for passive optical network optical feeds.

14. The system of claim 1, wherein the beacon signals allowed to pass through the dichroic mirror are associated with a different spectral band than a spectral band associated with the optical beams reflected by the dichroic mirror.

15. The system of claim 1, further comprising a second collimator optically coupled to the dichroic mirror and the position sensitive detector, the second collimator configured to collimate the beacon signals upon passing through the dichroic mirror.

16. A method comprising:
   transmitting/receiving at least one optical feed at an optical transceiver;
   collimating the optical feed using a first collimator optically coupled to the optical transceiver;
   when the optical transceiver transmits the optical feed, spatially separating, using a beam separator optically coupled to the first collimator, the optical feed into a plurality of optical beams;
   when the optical transceiver receives the optical feed, spatially combining, using the beam separator, the plurality of optical beams into the optical feed;
   reflecting the optical beams using a dichroic mirror optically coupled to the beam separator;
   allowing, using the dichroic mirror, beacon signals to pass through the dichroic mirror, each beacon signal corresponding to one of the optical beams;
   sensing, using a position sensitive detector optically coupled to the dichroic mirror, an incidence position of each beacon signal allowed to pass through the dichroic mirror;
   outputting, using the position sensitive detector, a position error for each optical beam based on the sensed incidence positions of the beacon signals; and
   directing, using a multi-axis optical steering system optically coupled to the dichroic mirror and in communication with the position sensitive detector, each optical beam based on the corresponding position error outputted from the position sensitive detector and a corresponding transmit/receive target, each transmit/receive target different from the other.

17. The method of claim 16, wherein the transmitting/receiving the at least one optical feed at the optical transceiver comprises transmitting/receiving a plurality of optical feeds at the optical transceiver, each optical feed having a different wavelength.

18. The method of claim 17, further comprising:
multiplexing, using a multiplexer optically coupled to the optical transceiver, the plurality of optical feeds into a multi-wavelength optical feed; and
demultiplexing, using the multiplexer, the multi-wavelength optical feed into the plurality of optical feeds.

19. The method of claim 18, wherein:
the spatially separating the optical feed into the plurality of optical beams comprises spatially separating the multi-wavelength optical feed into the plurality of optical beams, each optical beam corresponding to one of the optical feeds and having the corresponding wavelength of the corresponding optical feed; and
the spatially combining the plurality of optical beams into the optical feed comprises spatially combining the plurality of optical beams into the multi-wavelength optical feed.

20. The method of claim 19, wherein the optical transceiver comprises:
single-mode optical fibers for transmitting the optical feeds to the multiplexer; and
multi-mode optical fibers for receiving the optical feeds from the multiplexer.

21. The method of claim 16, wherein the transmitting/receiving the at least one optical feed at the optical transceiver comprises transmitting/receiving a single optical feed and the optical beams spatially separated/combined by the beam separator each share a single wavelength associated with the single optical feed.

22. The method of claim 21, wherein the optical transceiver comprises:
a single-mode optical fiber for transmitting the optical feed to the first collimator; and
a multi-mode optical fiber for receiving the optical feed from the first collimator.

23. The method of claim 16, wherein the optical transceiver comprises one or more optical fibers.

24. The method of claim 23, further comprising separating, using an optical circulator optically coupled to each optical fiber, a transmission path and a receiving path.

25. The method of claim 16, further comprising accommodating, using a field of view defined by a lens optically coupled to the multi-axis optical steering system and defining a center transmission axis, a beam steering angle range of the multi-axis optical steering system measured relative to the center transmission axis.

26. The method of claim 16, wherein the multi-axis optical steering system comprises a micro-electro-mechanical system, an array of fast steering mirrors, or an optical phase array.

27. The method of claim 16, wherein the beam separator comprises a prism for wavelength-division multiplexing optical feeds.

28. The method of claim 16, wherein the beam separator comprises a diffraction grating for passive optical network optical feeds.

29. The method of claim 16, wherein the beacon signals allowed to pass through the dichroic mirror are associated with a different spectral band than a spectral band associated with the optical beams reflected by the dichroic mirror.

30. The method of claim 16, further comprising collimating, using a second collimator optically coupled to the dichroic mirror and the position sensitive detector, the beacon signals upon passing through the dichroic mirror.

* * * * *